US008916078B2

(12) United States Patent
Poel-Asendorf et al.

(10) Patent No.: US 8,916,078 B2
(45) Date of Patent: Dec. 23, 2014

(54) METHOD FOR PRODUCING A VESSEL CLOSURE

(75) Inventors: Christiane Poel-Asendorf, Weyhe (DE); Rüdiger Wittenberg, Bremen (DE); Georg Schlenk, Wildeshausen (DE)

(73) Assignee: Actega DS GmbH, Bremen (DE)

( * ) Notice: Subject to any disclaimer, the term of this patent is extended or adjusted under 35 U.S.C. 154(b) by 486 days.

(21) Appl. No.: 12/741,722

(22) PCT Filed: Nov. 7, 2008

(86) PCT No.: PCT/EP2008/009421
§ 371 (c)(1),
(2), (4) Date: Aug. 10, 2010

(87) PCT Pub. No.: WO2009/059788
PCT Pub. Date: May 14, 2009

(65) Prior Publication Data
US 2010/0295211 A1    Nov. 25, 2010

(30) Foreign Application Priority Data

Nov. 9, 2007  (EP) .................................... 07021782
Feb. 8, 2008  (EP) .................................... 08002379

(51) Int. Cl.
*B29C 70/80*    (2006.01)
(Continued)

(52) U.S. Cl.
CPC ................. *C09K 3/10* (2013.01); *C08K 5/0008* (2013.01); *C09K 2200/0642* (2013.01);
(Continued)

(58) Field of Classification Search
USPC ................................................. 264/268, 141
See application file for complete search history.

(56) References Cited

U.S. PATENT DOCUMENTS

| 4,863,030 A | 9/1989 | Bayer et al. |
| 5,272,236 A | 12/1993 | Lai et al. |

(Continued)

FOREIGN PATENT DOCUMENTS

| DE | 1 782 737 A1 | 3/1972 |
| DE | 43 29 948 A1 | 3/1995 |

(Continued)

OTHER PUBLICATIONS

International Preliminary Report on Patentability (Chapter I) for PCT/EP2008/009421, mailed Jun. 10, 2010 from the International Bureau of WIPO, Geneva, Switzerland.

(Continued)

*Primary Examiner* — Larry Thrower
(74) *Attorney, Agent, or Firm* — Sterne, Kessler, Goldstein & Fox P.L.L.C.

(57) ABSTRACT

The invention relates to a method for producing a vessel closure for vessels comprising an opening that is to be closed by the vessel closure, an inner diameter of more than two cm and surrounds a polymer-based sealing element that is arranged in the vessel closure in such a manner that it sealingly rests on the opening of the vessel in the closed state. A polymer material becomes sufficiently free-flowing by warming and is applied to the vessel closure in the region of the sealing element that is to be produced, and optionally, is mechanically formed into the desired shape which it maintains after cooling. The invention also relates to a metal or plastic vessel closures for vessels for receiving drinks or food, and comprises a sealing insert, the material thereof being selected so that the migration of material components into the drink or food, that are a health risk, is prevented. The invention also relates to corresponding materials for said type of sealing inserts and to the use of specific polymers for producing the above-mentioned sealing inserts.

19 Claims, 1 Drawing Sheet

Figure 1:
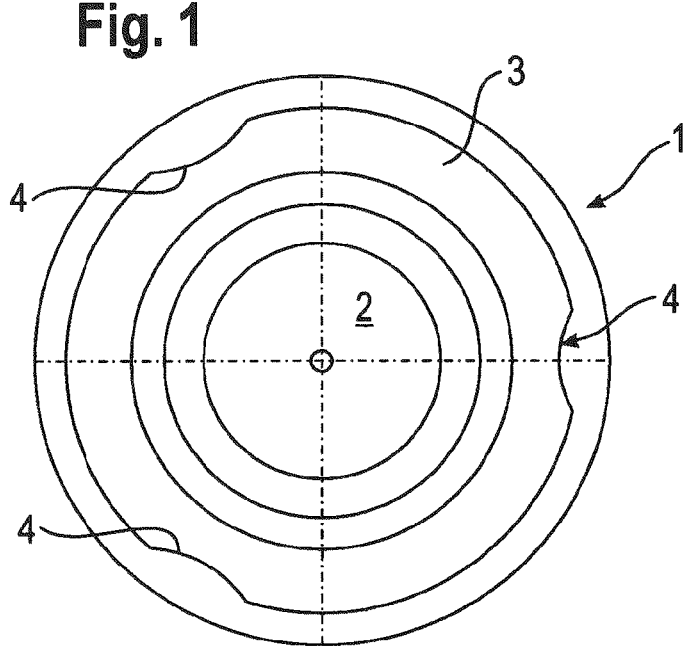

(51) Int. Cl.
*C08L 23/08* (2006.01)
*B65D 41/04* (2006.01)
*C09K 3/10* (2006.01)
*C08K 5/00* (2006.01)
*C08L 53/02* (2006.01)

(52) U.S. Cl.
CPC ...... *C08L 23/0815* (2013.01); *C09K 2200/062* (2013.01); *C09K 2200/0447* (2013.01); *C09K 2200/0617* (2013.01); *B65D 41/0485* (2013.01); *C08L 53/02* (2013.01); *C09K 2200/047* (2013.01); *B65D 41/045* (2013.01)
USPC .......................................................... 264/268

(56) References Cited

U.S. PATENT DOCUMENTS

| | | | | |
|---|---|---|---|---|
| 5,686,040 A | * | 11/1997 | Taber | ............................ 264/268 |
| 5,763,004 A | | 6/1998 | Hammen | |
| 6,235,822 B1 | * | 5/2001 | Whetten et al. | ............... 524/191 |

FOREIGN PATENT DOCUMENTS

| | | |
|---|---|---|
| EP | 0 503 124 A1 | 9/1992 |
| EP | 0 714 426 | 2/1995 |
| WO | WO 95/05427 A1 | 2/1995 |
| WO | WO 96/20878 | 7/1996 |

OTHER PUBLICATIONS

English translation of European Search Opinion issued in connection with corresponding European Application No. 10 006 004.5, dated Aug. 2, 2010, 5 pages.

International Search Report for PCT/EP2008/009421, mailed Mar. 20, 2009, European Patent Office.

* cited by examiner

METHOD FOR PRODUCING A VESSEL CLOSURE

BACKGROUND OF THE INVENTION

1. Field of the Invention

The invention relates to a method for producing a vessel closure for vessels having an opening that is to be closed by the vessel closure and has an inner diameter of more than 2 cm, wherein the vessel closure comprises a polymer-based sealing element which is arranged in the vessel closure in such a manner that it sealingly abuts on the opening of the vessel in the closed state.

2. Background Art

In particular, the invention relates to the production of corresponding lug caps.

The invention further relates to vessel closures producible according to said method and to the use of specific polymer compositions for producing the above-mentioned sealing elements.

BRIEF SUMMARY OF THE INVENTION

Whereas the industry has been using PVC-free compositions for the sealing liners of crown caps or screw-type bottle caps for some time, PVC-containing compositions are still used for screw caps, lug caps, PT-caps and the like which serve as vessel closures for vessels with a larger inner diameter of the opening. Generally, such PVC-containing compositions are applied at room temperature in their fluid form from plasticizer-containing systems.

However, it is undesirable to use PVC-containing compositions. During conventional household waste incineration halogenated polymers form acidic gases whose escape into the atmosphere is noxious. Moreover, such PVC-based sealing elements require the use of plasticizers which are likewise considered a health risk.

Thus, there is a need for vessel closures comprising a polymer-based, but not a PVC-based, sealing element which are suitable for vessels with relatively large openings with an inner diameter of more than 2 cm.

It is a principal object of the invention to provide a method for producing such vessel closures which makes it possible to provide the vessel closure with a polymer-based sealing element which does not contain PVC.

It is a further object of the invention to specify corresponding vessel closures.

Moreover, the invention encompasses the use of particularly suitable polymer compositions for the production of such vessel closures.

Generally, according to the invention, vessel closures are provided for such vessels whose opening to be closed by the vessel closure has an inner diameter of more than 2 cm. This corresponds to an inner diameter which is larger than that of conventional beverage bottles closed in the familiar manner with crown caps, screw caps and the like as described, e.g., in EP 0 503 124 B1.

The invention is particularly suitable for the production of relatively large vessel closures, i.e. for vessel openings with an inner diameter of more than 2.5 cm up to those where the inner diameter of the opening to be closed is greater than 4 cm.

Such vessel closures are suitable as screw caps for bottles, like juice bottles or milk bottles, for preserving jars, jam jars and the like.

In particular, the invention allows the production of lug caps with sealing elements of PVC-free polymer materials.

This object is achieved by the invention by means of the feature combination specified in claim 1.

Although for small closure diameters (crown caps, screw caps) the principle known as the "SACMI process," for example, has been used for decades, wherein a polymer composition is extruded and formed by stamping inside the closure blank into the final sealing liner, to date the industry has not found a solution for larger closure diameters (more than 2 cm) which allows the abandonment of PVC-based plastisols and the like.

The invention overcomes this prejudice by suggesting the production of sealing liners for such larger closure diameters by extrusion and subsequent forming of the sealing material.

Polymer compositions, which have been used thus far for smaller vessel closures of the kind described in EP 0 503 124, are generally (also) suitable for the method according to the invention.

However, the requirements to be met by sealing materials for vessel closures for larger inner diameters of the vessel opening may be more demanding. For such purposes, it is particularly important to combine a sufficient flowability of the polymer material during production of the sealing element with sufficient sealing properties in the closed state. This also encompasses the tightness required nowadays against gas ingress or gas escape, respectively, optionally combined with an overpressure valve effect preventing the burst of the vessel upon heating or upon the generation of overpressure in the vessel for other reasons. Moreover, for purposes typical for vessels with larger opening diameters (for example, preserves) it is particularly required that the sealing element can also be used under sterilizing conditions.

The vessel closures described in EP 0 503 124, which are typically intended for the bottling of beer, soft drinks, juice and the like into conventional narrow neck beverage bottles, may have to withstand the treatments described therein, like pasteurization and hot-filling. However, these are thermally considerably less-demanding processes than sterilization. The temperatures used for pasteurization and hot-filling are below 100° C.; typical sterilizing conditions are 121° C. or even 132° C. The polymer materials to be used in context of the invention are adapted to maintain their sealing action to the extent necessary, both during the pasteurization and hot-filling processes and the sterilization process.

Besides, not all compositions of the kind described in EP 0 503 124 can readily be used for larger closures. Even though EP 0 503 124 indicates that the compositions described therein are also suitable for screw caps and the like, this often only applies if the processing properties are varied accordingly—in particular, by adding extender oil in order to improve the flowability. This is not always desirable, e.g. with regard to the migration risk of composition components into fat-containing foodstuffs—compare Examples 1-21 below.

In this context, the production of lug caps is particularly problematic. Typically, they are used as closures for screw-top jars. If sealing liner material is PVC-based (as is conventional) and is applied into the closure blank as a plasticized, thin-fluid plastisol (during rotation of the blank under the dispensing nozzle), it easily spreads over the inner margin region and hardens there into an even sealing layer of the desired thickness after heating for typically 60 seconds at 200° C. Thus, the sealing liner is formed easily also in that area of the inner major surface of the closure which is covered by the inwardly protruding lugs.

This, however, will no longer be the case if a material is used for producing the sealing liner which does not possess such thin fluidity.

PVC-free materials lacking a plasticizer have to be applied in a thermally sufficiently softened form. Such sealing cannot be produced by rotating the blank and injecting the material, as is the case with PVC plastisols. This rather requires, e.g., extrusion and appropriate shaping. The latter is hampered by the lugs of a lug cap, as they render the introduction of the necessary tool impossible.

The production method according to the invention generally starts with a vessel closure blank made of metal or plastic which preferably is pre-treated on its inner surface with a suitable primer.

A TPE lacquer, for example the primer lacquer developed by the company Rhenania, is particularly suitable. The most preferred compositions according to the invention adhere particularly well to this lacquer.

Alternatively, a suitable primer coating may be applied by lamination, lining or possibly also by co-extrusion.

The polymer material foaming the sealing is applied to the inside of the such prepared blank in a thermally-induced flowable form. For this purpose, an extrusion wherein the sealing composition is supplied at a temperature ranging between 100° C. and 260° C. is particularly suitable.

The appropriate application quantity depends on the closure diameter. Typically (but, of course, not compulsorily) and by way of example the application quantity for a lug cap with an inner diameter of 66 mm and a disk-shaped sealing liner is in the range of between 1 and 2 g, in particular is about 1.4 g.

If the sealing liner shall be disk-shaped, the extrusion may, for instance, be performed into the middle of the blank's inner surface.

In the following, the disk-shaped sealing element is formed from the extruded, still flowable material by appropriate stamping (analogous to the known SACMI process).

In a variation thereof, the sealing element can be formed outside of the closure or closure blank by stamping a suitable polymer material and subsequent insertion into the closure or blank. This method is known for smaller closures as outshell-moulding from SACMI.

Alternatively, the sealing element may just be formed in a ring shape in the area which will later abut on the mouth of the vessel to be closed. This ring may be stamped into the closure, but it can also be loosely inserted if it has sufficient dimensional stability.

By way of example, the method described in U.S. Pat. No. 5,763,004 is in principle suitable for such application. Therein, a ring-shaped application is effected by an appropriate circular arrangement of application nozzles. This may be followed by an appropriate fixating step by stamping or the like.

Alternatively, the ring-shaped sealing element may be formed by first extruding a strand of the appropriate material. The thickness and length of the strand are selected in a manner that the strand, when closed to a circle and formed by appropriately stamping, corresponds to the form of the desired sealing element.

The strand is closed to a circle and picked up by a suitable tool in order to be inserted into the closure blank whilst heated. Subsequently, the strand is formed into the desired form of the sealing element by stamping.

Both the mounting tool and the stamping tool can be shaped narrowly enough to ensure that the lugs of the blank do not impede the insertion and stamping of the material.

It is obvious that the method according to the invention has the additional advantage over the known plastisol method that the sealing liner is already totally completed by forming (stamping) and—in contrast to the plastisol injection—does not require subsequent oven-curing.

The approach described herein is generally suitable for all vessel closure blanks whose inner surface is easily accessible.

If the sealing element formed in this manner is disk-shaped, it is preferred that a sealing element thickness of about 0.1-0.2 mm is provided in the middle region of the closure. Said middle section has no sealing effect as it lies within the vessel mouth.

If the vessel closure is completely even, this will have the effect that the sealing element will have a corresponding thickness in its sealing region as well.

If, however, the vessel closure has a depression ("channel") in the region corresponding to the mouth of the vessel to be closed, which is the rule for closures having PVC-based plastisol sealings, then the sealing element may be thicker in this region. This can be advantageous because of the greater elasticity of a thicker sealing element. In such cases, the sealing element often has a preferred thickness of about 1 mm in its sealing region.

A more complex shaping may also be provided in the sealing element region which sealingly contacts the vessel mouth; in particular, one or more sealing lips may be foamed. This may be done by appropriate shaping when the extrudate is stamped. The sealing element may then have an accordingly greater thickness in the region of such sealing lips, for example of up to 3 mm.

Initially, the forming of corresponding sealing elements in vessel closures whose inner surface is not freely accessible appears to be more problematic. A typical example of this is lug caps wherein, when looking onto the inside of the cap, the lugs partly cover the sealing region and prohibit the introduction of a stamp or the like which could form the sealing element in the region covered by the lugs.

This problem is overcome by an especially preferred embodiment of the invention which will now be further described with reference to the attached figures.

BRIEF DESCRIPTION OF THE DRAWINGS/FIGURES

Figure 2:
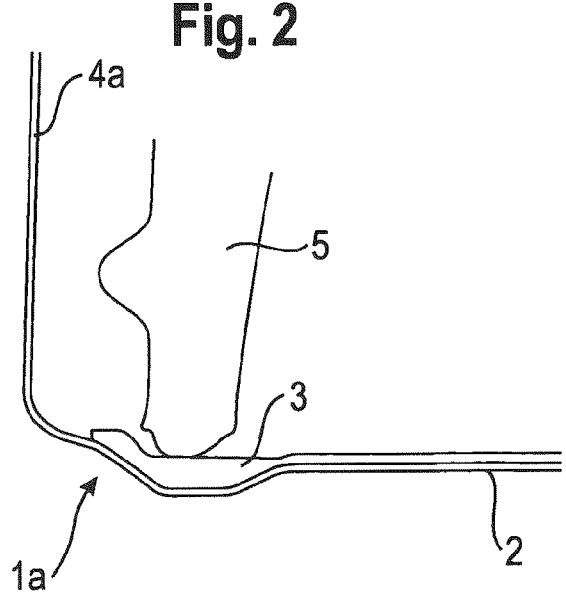
Figure 3:
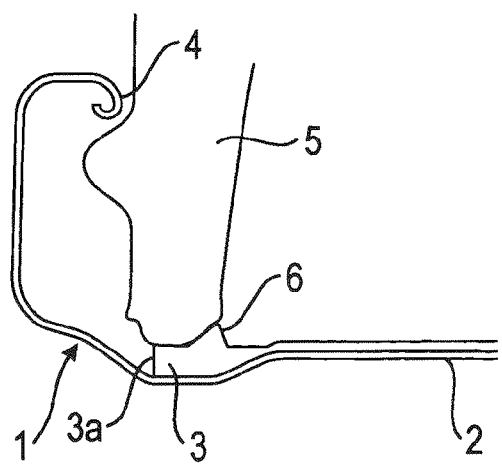

Therein the following is shown:
FIG. 1 is a conventional lug cap.
FIG. 2 is a first embodiment of the invention.
FIG. 3 is a second embodiment of the invention.

DETAILED DESCRIPTION OF THE INVENTION

FIG. 1 shows a top view onto the inner surface of a typical conventional lug cap (1).

The lug cap (1) has an approximately planar inner region (2) which is exposed towards the interior of the closed vessel when the cap is used, and which may come into contact with the vessel contents. In the example shown herein, a sealing element (3) (shadowed) does not cover the complete inner surface of the vessel closure (1), but instead forms a ring just in the outer region of the closure which contacts the mouth of the vessel to be closed when the closure is used. In a typical lug cap, this is the "channel region", which protrudes outwardly over the inner region (2) of the closure and thus forms a depression on the inside, wherein the sealing element (3) is situated. During conventional production, the PVC-plastisol is injected into this "channel" whilst the vessel blank is rotated. Subsequently, the closure is post-treated in an oven.

The lug cap (1) in the example shown in FIG. 1 has three lugs (4) in total, which engage the corresponding screw thread upon closure of the vessel and thus sealingly tighten the cap onto the vessel mouth.

As can be easily seen from FIG. 1, the lugs (4) partly cover the sealing element (3) when looking onto the inside of the closure (1). Thus, they would impede the introduction of a stamp suitable for forming the sealing element (3)—independently of whether the sealing element (3) is ring-shaped (as shown) or instead disk-shaped (in which case it would also cover the inner region (2)).

The invention proposes two alternative ways to form a sealing element by extrusion and subsequent stamping, even in a lug cap.

FIG. 2 shows the first embodiment of the invention. It shows a longitudinal section through a closure blank (1a) which shows the complete region from which the sidewall (4a) of the closure including the lugs will be formed later; moreover, the "channel region" and a part of the inner region (2) ending at about the center of the blank are shown.

In this embodiment, the sealing element is formed before the wall region (4a) of the blank is shaped for forming the lugs.

As shown in FIG. 2, this embodiment allows forming a conventional sealing element (3) by appropriate extrusion and stamping. This sealing element extends over the inner region (2) and into and beyond the channel region, thus forming a ring-shaped region which later can sealingly engage with the mouth of the outlined vessel (5).

In this embodiment, a further processing step is performed after the forming of the sealing element (3) has been completed. In said further processing step, the wall region (4a) of the blank is shaped downwards and inwards, thus forming the structure having the lugs (4) as visible in FIG. 1.

The alternative second embodiment of the invention is described in FIG. 3.

FIG. 3 shows more or less the same closure elements as FIG. 2. However, herein the sealing element is formed when the closure (1), including the lugs (4), has already been shaped.

As the lugs (4) prevent the introduction of a stamp which would allow forming the sealing element (3) as in FIG. 2, the sealing element of the present embodiment is only formed in the inner region (2) and further into the channel. As shown in FIG. 3, the sealing element (3) ends already inside the channel region with an outer edge (3a).

In order to achieve a good sealing against the vessel mouth (5) in spite of this, a lip (6) is provided on the sealing element (3) by corresponding shaping during stamping. As this region of the sealing element is accessible during stamping, even though the lugs (4) are present, this way of shaping is unproblematic; in comparison to the first embodiment according to FIG. 2 described above, it minimizes the impact on the process for forming the lug structure.

For performing the invention, and in addition to the known compositions already listed above, compositions based on thermoplastic elastomers are also suitable, for example compositions according to the following formulation:
Polyolefin, preferably linear low-density polyethylene (e.g. by SABIC): 40-50 kg
Styrene-ethylene/butylene-styrene block copolymer (e.g. Kraton G series): 15-25 kg
Polyolefin, preferably polyethylene/polypropylene copolymer (e.g. ADFLEX series): 5-10 kg
Medicinal white oil (viscosity 70 cSt): 20-30 kg
Erucic acid amide (Kemamide E): 0.25-0.5 kg
Oleic acid amide (ARMOSLIP CPA): 0.25-0.5 kg
Antioxidant (IRGANOX 1010): 0.05-0.15 kg
Stabilizer (IRGAFOS 168): 0.05-0.15 kg
Pigment: 0.2-0.7 kg If the use of extender oil shall be avoided, compositions as described in our parallel international application entitled "Migration prohibiting polymer compositions" are especially well suited.

The composition can be adapted to each specific purpose with regard to shore hardness, modulus of elasticity, rheologic properties and the like by means known from the prior art.

It is possible to provide the sealing liners according to the invention with barrier properties against oxygen and taste-affecting compounds like trichloroanisol by generally known procedures. Similarly and once more analogously to known procedures, the sealing elements according to the invention can be provided with the desired pressure maintenance or overpressure valve properties, respectively.

Advantageously, the vessel closures according to the invention are provided in a manner that they show a vacuum retention of the kind which is currently provided by conventional closures.

The desired vacuum retention is basically the extent to which an initially given vacuum in the empty part of the closed vessel is maintained even after pasteurization or sterilization, respectively, and after the expiry of the subsequent minimum shelf life of the product. For example, it might be required that a closed glass jar containing food has an initial internal pressure of less than 0.2 bar and that the internal pressure will not exceed 0.2 bar until the end of the minimum shelf life (minimum durability).

Typically, the vacuum retention is measured by perforating the cap of a random sample of vessels after pasteurization or sterilization, thus connecting the interior with a manometer. The internal pressure is read off and recorded. In another random sample, the progress of, e.g., the minimum durability can now be simulated by steam treatment at an elevated temperature ("accelerated ageing"). Afterwards the resulting internal pressure is measured as in the first random sample. The comparison of the results shows whether the product satisfies the requirements. This is not the case if the admissible internal pressure is exceeded in a too large a number of vessels in the random samples.

In addition to the method described above, the present invention also relates to metal or plastic vessel closures for vessels for receiving beverages or foodstuffs, having a sealing liner, the material thereof being selected so that the potentially harmful migration of material components into the beverage or foodstuff is prevented.

The invention also relates to corresponding materials for said type of sealing liners and to the use of specific polymers for producing the said sealing liners.

Whereas the industry has been using PVC-free compositions for the sealing liners of crown caps or screw-type bottle caps for some time, PVC-containing compositions are still used for screw caps and the like which serve as vessel closures for vessels with a larger inner diameter of the opening. Generally, such PVC-containing compositions are applied at room temperature in their fluid form from plasticizer-containing systems.

However, it is undesirable to use PVC-containing compositions in packaging materials. During the usual household waste incineration, halogenated polymers form acidic gases whose escape into the atmosphere is noxious. Furthermore, even small quantities of PVC interfere with the recycling of plastic waste. Moreover, such PVC-based sealing elements require the use of plasticizers which are likewise considered a health risk.

Larger vessel closures as considered herein are particularly lug caps which are typically used for closing screw top jars for foodstuffs or beverages. Said foodstuffs are often fat-containing products, for example convenience food, dressings, delicatessen, antipasti, spice pastes and the like, whose fat content and/or oil content increases the risk that fat-soluble components of the packaging material are released into the foodstuff.

These requirements are especially relevant also for baby food, which is typically sold in jars having a press-on, Twist-Off®-closure.

This migration of components of the packaging (which may also encompass the sealing liner of the vessel closure) into the foodstuff is not only generally undesired, but also strictly regulated by legal requirements. Such requirements are for example the EC directives 1935/2004, 2023/2006, 2002/72/EG and 372/2007.

The extent of the migration, if monitored, is determined by methods as specified in particular in DIN EN 1186. Such methods are also applied in the context of the present invention.

It is not a trivial task to provide vessel closures of the kind considered herein with PVC-free sealing liners when these closures have to comply with the said regulations with regard to the possible migration of their chemical components.

For smaller vessel closures, sealing liners having a barrier effect against specific contaminants have already been used, for example the ones described in EP 0 503 124.

However, the requirements to be met by sealing materials for vessel closures for larger vessel opening inner diameters may be more demanding. For such purposes it is particularly important to combine a sufficient flowability of the polymer material during sealing element production with sufficient sealing properties in the closed state. This also encompasses the tightness required nowadays against gas ingress or escape, respectively, optionally combined with an overpressure valve effect preventing the vessel from bursting upon heating or upon the generation of overpressure in the vessel because of other reasons. Moreover, and in particular for purposes typical for vessels with larger opening diameters (for example preserves), it is required that the sealing element also be able to be used under sterilizing conditions.

The vessel closures described in EP 0 503 124, which are typically provided for the bottling of beer, soft drinks, juice and the like into conventional narrow neck beverage bottles, may have to withstand the treatments described therein, like pasteurization and hot-filling. However, these are thermally considerably less-demanding processes than sterilization. The temperatures used for pasteurization and hot-filling are below 100° C.; typical sterilizing conditions are 121° C. or even 132° C. The polymer materials used according to the invention are adapted to be suitable for pasteurization or hot-filling on the one hand, and to maintain their sealing action to the extent necessary at the higher sterilization temperatures on the other.

Furthermore, the sealings have to comply with the requirements indicated above with regard to the possible migration of chemical components.

The compositions known in the art, however, often cannot be processed into larger sealing liners as this is prohibited by their flow properties.

In order to facilitate the processing of conventional compositions, extenders and/or plasticizers are usually added to them. In particular, components are used which are liquid at the application temperature, like extender oils (preferably white oil).

Surprisingly, it has now been shown that even though such compositions are also processable into sealing liners with larger diameters—as the case may be after modifying the formulation—the vessel closures equipped with such sealing liners do not always comply with the legal requirements concerning the migration of chemical components.

Thus, there is a need for vessel closures that have a sealing liner on a polymer basis, which is not PVC based, and that are suitable for vessels with relatively large openings (with an inner diameter that is greater than 2 cm).

It is a principal object of the invention to provide a suitable sealing liner for producing such vessel closures that makes it possible to equip the vessel closure with a polymer-based sealing element which does not contain PVC and which complies with the legal requirements concerning the migration of packaging components.

It is a further object of the invention to specify corresponding vessel closures.

Moreover, the invention encompasses the use of particularly suitable polymer compositions for the production of such vessel closures.

To achieve the object, a vessel closure according to the invention is provided with the features as specified in Example 1.

To achieve the object of the invention, a material as specified in Example 16 is used therein, wherein the sealing liner then has the properties as described in Example 17.

The uses indicated in Examples 19 and 20 ensure that the invention complies with the legal requirements.

Generally, the invention provides vessel closures even for vessels whose opening to be closed with the vessel closure has an inner diameter of more than 2 cm. This corresponds to an inner diameter greater than the inner diameter of conventional beverage bottles which are closed in a known manner with crown caps, screw caps and the like as described for example in EP 0 503 124 B1.

The invention is particularly suitable for the production of relatively large vessel closures, i.e. for vessel openings with an inner diameter of more than 2.5 cm up to those where the inner diameter of the opening to be closed is greater than 4 cm.

Such vessel closures are suitable as screw caps for bottles, like juice bottles or milk bottles, for preserving jars, jam jars and the like, and in particular for screw top jars for fat-containing foods like dressings, spice pastes and the like.

The vessel closures according to the invention (in the form of so-called press-on, Twist-Off® closures) are also suitable for packaging baby and infant food in appropriate jars.

The sealing element of the vessel closures according to the invention is formed as a liner on the inner surface of the vessel closure in a similar manner as in conventional crown caps or screw caps, respectively.

Whilst the sealing element of the conventional bottle closures (crown caps and the like) is most often forming a disk on the inner side of the vessel closure, it may be advantageous for larger vessel closures like the closures according to the invention to faun only a ring made of polymer material instead, which abuts on the vessel wall around the mouth when the vessel is closed. Such ring-shaped sealing elements are known, but to date they have been made exclusively from PVC-containing material as explained above.

For this purpose, the method described in U.S. Pat. No. 5,763,004 can be used, which is incorporated herein by reference.

The invention can also be used very advantageously for vessel closures with a disk-shaped sealing liner, which may also be lug caps. For this purpose, one of the production methods as described above, in particular, can be used.

More specifically, the present invention generally relates to metal or plastic vessel closures for vessels for receiving beverages or foodstuffs which have to be protected from migration of packaging components according to the legal provisions. These are, for example, oil-containing or fat-containing foodstuffs, like convenience food, but, in particular, oil-containing dressings and spice pastes, e.g. curry paste. The oil and fat components of such foodstuffs are particularly good solvents for extenders like white oil, but also for plasticizer components.

In order to ensure tight sealing of the vessel, the vessel closures according to the invention comprise a sealing liner which meets the requirements listed above with regard to its processability, on the one hand, and its sealing properties, on the other, and which, moreover, meets the legal requirements with regard to the migration of packaging components.

In order to achieve this goal, the material of the sealing liner is selected in a manner that the migration of material components into the beverage or foodstuff is prevented.

The major component of the sealing liner material is a polymeric component foaming its main structure. The properties of this major polymeric component can be suitably modified by adding further components, for example further polymers.

However, according to the invention it is intended that the sealing liner material only comprise very minor amounts of components which are fluid at the application temperature. Generally, the application temperature equals the ambient temperature, i.e. it is in the range of usual ambient temperatures outdoors or in heated rooms, respectively.

Thus, only minor or preferably no amounts of fluid extenders like, in particular, white oil are added to the sealing liner material.

In preferred embodiments, the material comprises no more than 10%, preferably no more than 7%, in particular no more than 4%, and especially preferred no more than 1% of such fluid components.

It is currently most preferred that, within the analytical detection limits at the application date, the material contains no components at all which are fluid at the application temperature.

Moreover, it is preferred that the sealing liner material not contain plasticizers.

As compositions for such sealing liners are sometimes difficult to process without the addition of an extender when the material is composed, e.g., on the basis of styrene-containing block copolymers with elastomeric chain sections as described in EP 0 503 124, in particular if the diameter of the vessel closure exceeds 2 cm, materials which do not contain these polymers are preferred in the context of the present invention.

It is thus preferred that the material from which the sealing liner is formed contains neither the listed fluid extenders, nor plasticizers, nor styrene-containing block copolymers with elastomeric chain sections.

Instead it is preferred that the polymer material, which is the major component of the sealing liner, is based on specific polyalkylenes which are processable without extenders or the like even into sealing liners for vessel closures with diameters of more than 2 cm.

It has turned out that a copolymer comprising polyethylene units, on the one hand, and being formed from an alkene monomer selected from propene, butene, hexene and (in particular) octene, on the other, is particularly suited for this purpose.

Such copolymers can be manufactured specifically with the desired physical properties using metallocene catalysts.

Preferably, said material has a shore A hardness of 40-90 and, in particular, a hardness of 60-75. The compression set determined according to ASTM . . . (70° C., 22 h, 25% compression) is preferably in a range of from 30-70% and especially preferred between 30 and 50%.

Suitable polymers are described in EP 0 714 426. Therein, it is stated that these polymers as such are also processable into sealing elements, wherein no additives at all shall be used (p. 2, 1. 26-28). The problem of material component migration is not addressed.

An exemplary formulation comprises:
Ethylene-octene copolymer having the above-referenced properties: 45%
EVA (14% VA): 40%
Highly flowable PP: 14%
Stabilizers (Irganox 1010, Irgafos 168): 0.2%
Lubricant (erucic acid amide): 0.2%
Lubricant (oleic acid amide): 0.2%
Pigment: 0.4%

Such materials can also be processed into large sealing elements for correspondingly large vessel openings, for example following our parallel international patent application (entitled "Method for producing a vessel closure"). Thereby, it is now possible for the first time to provide, for example, lug caps having a diameter of more than 60 mm with a sealing liner complying with the regulations of EC directives 1935/2004, 2023/2006, 2002/72/E/G and 372/2007.

According to these legal requirements, migration tests have to be performed with the vessel closures according to the invention in the manner described in DIN EN 1186. This is the reason why these measurement methods are not reproduced in the context of the present application; said tests are herewith incorporated by reference to DIN EN 1186 into the disclosure of the present application.

According to the invention, using the described polymer material allows the thus-produced sealing liner not only to be produced without a problem and to possess the sealing properties described at the beginning of the description. Moreover, such vessel closures are not only pasteurizable, but also sterilizable, and they comply with the previously described regulations of European law concerning the migration of polymer material components into the beverage or foodstuff contained in the vessel closed according to the invention.

In this respect, the requirements of said European legal directives, in particular the requirements in context with the test criteria of DIN EN 1186, are suitable selection criteria for the polymer material which can be selected from the plurality of generally available compositions by setting aside components which are fluid at the application temperature and by subsequent testing.

EXAMPLES

A vessel closure made of metal or plastic for a vessel for receiving beverages or foodstuffs, the vessel closure having a sealing liner, wherein the sealing liner material is selected so that the migration of material components into the beverage or foodstuff is prevented, and wherein the major component of the material is at least one polymeric component contributing to the sealing action of the sealing element and being substantially free of components which are fluid at the application temperature.

A vessel closure similar to Example 1, wherein the sealing liner material comprises no more than 10%, preferably no more than 7%, in particular no more than 4%, and especially preferred no more than 1% fluid components.

A vessel closure similar to Example 1 or 2, wherein within the detection limits the material contains no components which are fluid at the application temperature.

A vessel closure similar to any one of Examples 1 to 3, wherein the material contains less than 4% extender (in particular, white oil), and preferably no extender at all.

A vessel closure similar to any one of Examples 1 to 4, wherein the material contains no plasticizer.

A vessel closure similar to any one of Examples 1 to 5, wherein the material does not contain polymers with elastomeric chain sections, in particular does not contain (block) copolymers.

A vessel closure similar to any one of Examples 1 to 6, wherein the material comprises at least one poly(alkylene) component, preferably as a copolymer.

A vessel closure similar to any one of Examples 1 to 7, wherein the material is a copolymer comprising polyethylene and an alkene, in particular an alkene selected from propene, butene, hexene and octene, and particularly preferred octene.

A vessel closure similar to Example 8, wherein at least one copolymer is polymerized by metallocene catalysis.

A vessel closure similar to any one of Examples 1 to 9, wherein the vessel closure has an inner diameter of more than 2 cm.

A vessel closure similar to any one of Examples 1 to 10, wherein the vessel closure is a lug cap, a press-on Twist-Off® closure, a snap-on cap, a crimp-on cap or a roll-on metal cap.

A vessel closure similar to any one of Examples 1 to 11, wherein the sealing liner material is selected so that the closure complies with the regulations of EC directive 1935/2004.

A vessel closure similar to any one of Examples 1 to 12, wherein the sealing liner material is selected so that the closure complies with the regulations of EC directive 2023/2016.

A vessel closure similar to any one of Examples 1 to 13, wherein the sealing liner material is selected so that the closure complies with the regulations of EC directive 2002/72/EG.

A vessel closure similar to any one of Examples 1-14, wherein the sealing liner material is selected so that the closure complies with the regulations of EC directive 372/2007.

Vessel closure similar to any one of Examples 1-15, wherein a sealing liner has been produced by extrusion of the corresponding material, introduction of a suitable amount thereof into a vessel closure blank, and subsequent forming of the sealing liner by stamping or the like, or is formed by a disk-shaped or ring-shaped element which has been formed outside of the closure and then inserted into the closure.

A material for producing a sealing element, in particular in granulated form, comprising the components as defined in any one of Examples 1 to 15.

A sealing liner for a vessel closure comprising the components as defined in any one of Examples 1 to 15.

A vessel, in particular a screw-top jar, for beverages or foodstuff having a vessel closure according to any one of the preceding Examples.

Use of a polymer material which is substantially free of components which are fluid at the application temperature, for producing a sealing liner in a vessel closure for a vessel for receiving a beverage or foodstuff, wherein the migration of polymer material components into the beverage or foodstuff complies with the legal provisions of EC directive 1935/2004, preferably also of EC directive 2023/2006 and in particular also of EC directive 372/2007.

The use according to Example 20, wherein the polymer material meets the specification of at least one of Examples 1-15.

What is claimed is:

1. A method for producing a press-on, twist-off vessel closure, the method comprising:
   providing a vessel closure;
   heating a polymer-based sealing element until the sealing element is made sufficiently flowable, wherein the sealing element has a Shore A hardness in a range from 40 to 90 and a compression set in a range from 30% to 70%; and
   applying the sealing element to the vessel closure in such a manner that the sealing element sealingly abuts the opening of the vessel in a closed state,
   wherein the vessel closure is configured for use as a mess-on, twist-off vessel closure for a vessel having an opening that is to be closed by the vessel closure and has an inner diameter of more than 2 cm.

2. The method according to claim 1, wherein the vessel closure corresponds to an inner diameter of the vessel opening of more than 2.5 cm, preferably more than 3 cm, more preferably of at least 3.5 cm and especially preferred of at least 4 cm.

3. The method according to claim 1, wherein the vessel closure is formed as a screw-cap for a bottle, a jar or the like.

4. The method according to claim 1, wherein the sealing element is formed as an inner liner on the inner surface of the vessel closure.

5. The method according to claim 4, wherein the sealing element is ring-shaped or disk-shaped.

6. The method according to claim 1, wherein the sealing element consists of a polymer or a polymer composition.

7. The method according to claim 1, wherein the polymer composition is composed such that the sealing element is usable under pasteurization conditions.

8. The method according to claim 1, wherein the polymer composition is composed such that the sealing element is usable under sterilization conditions.

9. The method according to claim 1, wherein the vessel closure has a gas barrier effect and/or an overpressure valve effect in the closed state.

10. The method according to claim 1, wherein the vessel closure provides a vacuum retention in the closed state.

11. The method according to claim 1, wherein the polymer material is provided as a granulate and is heated by an extruder.

12. The method according to claim 9, wherein the flowable polymer material is applied with a nozzle onto the inner side of the vessel closure.

13. The method according to claim 11, wherein the applied polymer material is formed by a stamp or the like.

14. The method according to claim 1, wherein the vessel closure is a lug cap.

15. The method according to claim 12, wherein the sealing element is formed by stamping in a closure blank before shaping the wall with the lugs, and thereafter the wall with the lugs is shaped.

16. The method according to claim 12, wherein the sealing element is shaped by stamping in a preformed closure blank.

17. The method according to claim 15, wherein the outer diameter of the stamp does not exceed the freely accessible area of the inner diameter of the blank.

18. The method according to claim 1, wherein the sealing liner has a lip which sealingly interacts with the mouth of the vessel to be closed.

19. The method according to claim 1, further comprising: mechanically forming the sealing element into a desired shape, wherein the sealing element is configured to remain in the desired shape after cooling down.

* * * * *

UNITED STATES PATENT AND TRADEMARK OFFICE
CERTIFICATE OF CORRECTION

PATENT NO.       : 8,916,078 B2                                                 Page 1 of 1
APPLICATION NO.  : 12/741722
DATED            : December 23, 2014
INVENTOR(S)      : Poel-Asendorf et al.

It is certified that error appears in the above-identified patent and that said Letters Patent is hereby corrected as shown below:

In the claims
In column 12, lines 17-18, claim 1; "wherein the vessel closure is configured for use as a mess-on, twist-off vessel closure" should read -- wherein the vessel closure is configured for use as a press-on, twist-off vessel closure --.

Signed and Sealed this
Twenty-fourth Day of May, 2016

Michelle K. Lee
*Director of the United States Patent and Trademark Office*